. United States Patent [19]

Künzel et al.

[11] 3,839,285

[45] Oct. 1, 1974

[54] PROCESS FOR ISOLATING AROMATIC POLYAMIDES IN POWER FORM FROM SOLUTIONS

[75] Inventors: Hans Egon Künzel; Jürgen Schramm, both of Dormagen; Günter Blankenstein, Stommeln; Gerhard Dieter Wolf, Dormagen, all of Germany

[73] Assignee: Bayer Aktiengesellschaft, Leverkusen, Germany

[22] Filed: July 6, 1973

[21] Appl. No.: 377,091

[30] Foreign Application Priority Data
July 8, 1972 Germany............................ 2233722

[52] U.S. Cl............................ 260/47 CZ, 260/78 S
[51] Int. Cl............................................. C08g 20/20
[58] Field of Search ............ 260/47 CZ, 78 S, 78 R

[56] References Cited
UNITED STATES PATENTS

| | | | |
|---|---|---|---|
| 2,388,278 | 11/1945 | Moncrieff et al. | 260/78 |
| 2,639,278 | 5/1953 | Stott et al. | 260/78 |
| 3,228,902 | 1/1966 | Beste | 260/29.2 |
| 3,586,654 | 6/1971 | Lerman et al. | 260/41 |
| 3,631,003 | 12/1971 | Goodman et al. | 260/78 R |
| 3,673,162 | 6/1972 | Buckley et al. | 260/78 R |

*Primary Examiner*—Lester L. Lee
*Attorney, Agent, or Firm*—Plumley & Tyner

[57] ABSTRACT

The invention relates to a process for isolating in powder form, aromatic polyamides which are readily soluble in polar organic solvents which comprises diluting solutions of the readiyl soluble aromatic polyamides obtained by polycondensation of aromatic diamines and aromatic dicarboxylic acid chlorides in polar solvents to 1.5 to 4 times their original volume with a liquid halogenated or CN-containing hydrocarbon without first being neutralised and precipitating the polyamide from the resulting clear, dilute solutions in the form of a fine powder by passing ammonia or another strongly basic amine into or over the solutions until the solvent mixture is neutral in reaction.

10 Claims, No Drawings

PROCESS FOR ISOLATING AROMATIC POLYAMIDES IN POWER FORM FROM SOLUTIONS

This invention relates to a process by which aromatic polyamides which are readily soluble in polar organic solvents are isolated in powder form by diluting the solutions obtained in the preparation of the polyamides with certain hydrocarbons which contain halogen or CN groups and neutralising them with ammonia or a strongly basic amine.

It is known that aromatic polyamides can be precipitated from their solutions in polar organic solvents (dimethylacetamide or N-methylpyrrolidone) by stirring these solutions into water or mixing them with water in high speed mixers. However if the aromatic polyamide is very soluble in the polar solvents the polyamide which is precipitated in this way is not obtained in the form of a powder but in the form of a coarse flocculent or fibrous precipitate. When spinning solutions are prepared from such precipitated polyamides, the particles tend to stick or clump together and are difficult to redissolve. The most serious disadvantage of the precipitation methods mentioned above, however, is that when using aromatic polyamides which are very soluble in polar solvents, (for example the polyamide obtained from 3-(p-aminophenyl)-7-aminoquinazoline dione and isophthalic acid dichloride) precipitation must be carried out from very dilute solutions. If this is not done then thick, fibrous floccules and lumps are obtained which are very difficult to wash free from solvent and dry. Moreover, when precipitation is carried out from such dilute solutions at concentrations of about 5 to 7 percent, it is necessary to deal with very large quantities of solvent as well as very large amounts of water (about 5 to 8 times as much water as solvent). The situation is similar when polyamides are precipitated with organic liquids (methanol, ethanol, acetone).

For many reasons, however, it may be desirable to isolate the polyamide in the form of a powder, for example because the solid polyamide is more stable in storage than the solution and the problems entailed in neutralising the polyamide solution, which is originally obtained as a hydrochloric acid solution, are more easily solved if the polyamide is obtained in the form of a powder.

A process has now been found by which aromatic polyamides which are easily soluble in polar organic solvents can be isolated in the form of very fine powders which are easily dried and can easily be redissolved in polar solvents such as dimethylformamide, dimethylacetamide or N-methyl-pyrrolidone. The new process also has the advantage over the precipitation processes previously employed that the filtrate of polar organic solvent and halogenated aliphatic hydrocarbon is substantially free from solids and in particular free from inorganic and organic salts and therefore can easily be separated into its components by distillation and worked up.

An object of this invention is therefore a process for isolating in powder form aromatic polyamides which are easily soluble in polar organic solvents which comprises diluting solutions of the easily soluble aromatic polyamides which are obtained by polycondensation of aromatic diamines and aromatic dicarboxylic acid chlorides in polar solvents to 1.5 to 4 times their original volume with a liquid halogenated hydrocarbon or hydrocarbon which contains CN groups without first being neutralised, and precipitating the polyamide in the form of a fine powder from the resulting clear, dilute solutions by passing ammonia or some other strongly basic amine into or over the solutions until the solvent mixture is neutral in reaction.

In this new process, the solution of easily soluble aromatic polyamide obtained by polycondensation of one or more aromatic diamines and one or more aromatic acid chlorides in polar organic solvents is first diluted to 1.5 to 5 times its original volume by slowly adding liquid halogenated or CN-containing aliphatic hydrocarbons. The amount added must not be enough to start precipitation at this stage. Gaseous ammonia or some other strong basic amine is then introduced into the solution or preferably into the atmosphere above the solution with vigorous stirring until the solution is neutral. The polyamide which is thereby precipitated in the form of a very fine powder is suction filtered, washed several times with the same halogenated aliphatic hydrocarbon as that previously used for dilution and then stirred into hot water so that the ammonium chloride which has been precipitated at the same time and which is insoluble in the mixture of polar organic solvents and halogenated or CN-containing organic hydrocarbon is removed from the polyamide. The powder is then again suction filtered, washed free from chloride with water and dried under a vacuum at 80° to 150° C. Isolation of the polyamide powder and its aftertreatment may if desired also be carried out in a pressure and suction filter or a pressure and suction filter equipped with stirrer.

The process may also be modified by replacing part of the polar organic solvent by halogenated or CN-containing aliphatic hydrocarbon even before polycondensation, for example by dissolving the diamine in a solvent mixture of polar organic solvent and halogenated or CN-containing aliphatic hydrocarbon and then introducing solid dicarboxylic acid chloride or by dissolving the diamine in the pure polar solvent and then adding the dicarboxylic acid dichloride in the form of a solution in the halogenated or CN-containing aliphatic hydrocarbon. If desired, part of the liquid halogenated or CN-containing aliphatic hydrocarbon may also be added during the stage of polycondensation.

The liquid halogenated hydrocarbons used may be low molecular weight aliphatic hydrocarbons which contain one to eight C atoms and at least one and preferably several halogen atoms, preferably chlorine. If possible, not all the hydrogen atoms on one C atom should be replaced by halogen. The following compounds are examples of suitable aliphatic, liquid halogenated hydrocarbons:

Chloroform,
1,1-dichloroethane,
1,1,2-trichloroethane,
1,1,2-trichloroethylene,
1,1,2,2-tetrachloroethane,
1,2-dibromoethane,
1,1,2,2-tetrachlorobromoethane,
1,1,2,3,3-pentachloropropane,
1,2-dichloropropane and
1,2-dibromopropane.

The chlorinated hydrocarbons preferably used for the process of this invention are, however, methylene chloride and 1,2-dichloroethane (ethylene chloride). Aliphatic hydrocarbons which are completely halogenated, for example carbon tetrachloride or perchloroethylene, and aliphatic hydrocarbons in which all the hydrogen atoms on one carbon atom have been replaced by halogen, for example, 1,1,1-trichloroethane, are in most cases less suitable for the process because they precipitate the polyamide too rapidly.

Liquid CN-containing aliphatic hydrocarbons used are preferably acetonitrile or propionitrile.

Any aromatic polyamides which are easily soluble in polar organic amidic solvents such as dimethylacetamide, N-methylpyrrolidone or tetramethylurea without the addition of inorganic salts are suitable of isolation in powder form by the process of this invention. Polyamides of this type have been described in German Offenlegungsschrift Nos. 1,720,686 and 1,811,411. For example, the process is suitable for aromatic polyamides which have been obtained from isophthalic acid dichloride and one of the following diamines:

2,5,5'-trimethyl-4,4'-diaminobenzanilide,
3,4'-dimethyl-4,3'-diaminobenzanilide,
2-(m-aminophenyl)-3-phenyl-6-amino-4(3H)-quinazolone and
3-(p-amino-m-methyl-phenoxy)-4'-amino-3'-methylbenzanilide;

or for aromatic polyamides obtained from 4-amino-3-methyl-3'-(p-amino-o-chloro-phenoxy)-benzanilide and terephthalic acid dichloride.

The process is particularly suitable for polyamides obtained from isophthalic acid dichloride and diamines of the general structure I, for example the polyamide obtained from isophthalic acid dichloride and 3-(p-aminophenyl)-7-amino-(1H, 3H)-quinazoline-dione-(2,4).

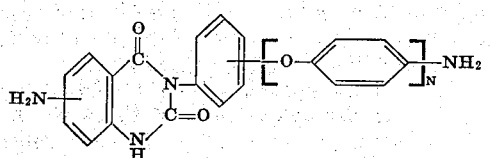

(n = 0 or 1)

The process is less suitable for aromatic polyamides which are only sparingly soluble in the polar solvents mentioned above and will only dissolve in the presence of inorganic salts.

EXAMPLE 1

134 g (1/2 mol) of 3-(p-aminophenyl)-7-amino-(1H,3H)-quinazoline-dione-(2,4) are suspended in 700 g of anhydrous dimethylacetamide. 101.5 g (1/2 mol) of isophthalic acid dichloride are introduced at room temperature with stirring. The solution, which temporarily heats up to a temperature of 35° to 45°C, is then stirred at room temperature for 5 to 8 hours. 1.2 litres of (commercial) methylene chloride are then introduced dropwise (over a period of about 2 – 3 hours) with vigorous stirring. Ammonia is then injected into the space above the clear solution until the solution is neutral. Towards the end of neutralisation, when the polyamide has already partly precipitated and the viscosity of the solution has dropped sharply, the rate of stirring is increased. The polyamide powder is suction filtered and washed several times with methylene chloride. It is important, at least in the first washing processes, not to suck the polyamide completely dry before fresh methylene chloride is added because otherwise the polyamide will become sticky. After this treatment, the polyamide is boiled in about 3 litres of water, suction filtered, washed free from chloride and dried. 197 g (99 percent of the theory) of polyamide is obtained in the form of a fine powder which can be passed practically without residue through a sieve with a mesh of 0.5 mm. The relative viscosity of the polyamide (determined on a solution containing 0.5 g of polyamide in 100 ml of solution using N-methylpyrrolidone as solvent) is 1.97. The polyamide is easily soluble in cold dimethylformamide. These solutions are stable for several weeks at room temperature. The polyamide is also easily soluble in dimethylacetamide and in N-methylpyrrolidone. These solutions are also stable for some time at elevated temperatures (80° to 100°C).

EXAMPLE 2

134 g of 3-(p-aminophenyl)-7-amino-(1H,3H)-quinazoline-dione-(2,4) are suspended in 500 g of anhydrous dimethylacetamide. A solution of 101.5 g of isophthalic acid dichloride in 200 ml of distilled methylene chloride is rapidly poured in (within 20 to 30 seconds) with stirring (the temperatures of the resulting polyamide solution may rise until the methylene chloride begins to boil). The solution is then stirred for 5 to 8 hours at room temperature. 800 ml of methylene chloride are then added dropwise. The solution is then neutralised and worked up as described in Example 1. The polyamide obtained by this process had a relative viscosity (determined as in Example 1) of 1.94. The yield was 196 g = 98.5 percent of the theory. The polyamide had the same particle size and solubility as the polyamide obtained in Example 1.

EXAMPLE 3

134 g of 3-(p-aminophenyl)-7-amino-(1H,3H)-quinazoline-dione-(2,4) are suspended in 500 g of anhydrous dimethyl acetamide. A solution of 101.5 g of isophthalic acid dichloride in 200 ml of distilled chloroform are rapidly poured in at room temperature (within 20 to 30 seconds) with stirring. The solution is then stirred at room temperature for 5 to 8 hours. 800 ml of chloroform are then added dropwise. The solution is then neutralised and worked up as described in Example 1, using chloroform to wash the precipitate. The polyamide obtained by this process had a relative viscosity (determined as in Example 1) of 1.84. The yield was 196 g = 98.5 percent of the theory. The polyamide had the same particle size and solubility as the polyamide obtained in Example 1.

EXAMPLE 4

134 g (½ mol) of 3-(p-aminophenyl)-7-amino-(1H,3H)-quinazoline-dione-( 2,4) are suspended in 700 g of anhydrous dimethylacetamide. 101.5 g (½ mol) of isophthalic acid dichloride dissolved in 100 ml of 1,2-dichloroethane are added dropwise at room temperature with stirring. The solution, which temporarily heats up to 35°–45°C, is then stirred for 5 to 8 hours at room temperature. 1.2 litres of 1,2-dichloroethane are then added dropwise with vigorous stirring (in the course of about 2 to 3 hours). Ammonia is then injected into the space above the clear solution until the solution is neutral. The precipitated product is filtered through a pressure and suction filter, washed twice with 1,2-dichloroethane, steam treated on the pressure and suction filter and then boiled in water, suction filtered, washed free from chloride with water and dried. 195 g = 98 percent of the polyamide powder are obtained. The relative viscosity of the powder (determined as in Example 1) is 1.87. The product has the same particle size and solubility as the product obtained in Example 1.

The products obtained in Examples 1 to 4 are dissolved in dimethylformamide to form a 16 percent solution which is then spun into an aqueous precipitation bath at 20°C. The threads obtained after stretching by 1:5.3 to 1:10 at 440° to 445°C have a tensile strength of 3.1 to 4.3 g/dtex and an elongation at break of 2 to 4 percent.

EXAMPLE 5

134 g (½ mol) of 3-(m-aminophenyl)-7-amino-(1H,3H)-quinazoline-dione-(2,4) are suspended in 700 g of anhydrous N-methylpyrrolidone. 101.5 g (½ mol) of isophthalic acid dichloride are introduced at room temperature with stirring and then stirred at room temperature for 8 hours. The solution is then diluted with 1.2 litres of methylene chloride, neutralised with $NH_3$ and worked up as described in Example 1. 192 g = 96.5 percent of the theory of a polyamide powder are obtained. The powder has a relative viscosity (determined as in Example 1) of 1.62 and is easily soluble in dimethylformamide, N-methylpyrrolidone and dimethylacetamide.

EXAMPLE 6

333 g of 3-(p-aminophenoxy)-4'-amino-3'-methylbenzanilide are dissolved in 1,000 ml of anhydrous N-methylpyrrolidone. 203 g of terephthalic acid dichloride are then introduced at room temperature with stirring. The solution quickly becomes very viscous and is diluted with 500 ml of N-methylpyrrolidone. It is then stirred for 6 hours at room temperature. 1,200 ml of methylene chloride are then added dropwise and the solution is neutralised by passing $NH_3$ gas over it. It is then further diluted with 1,000 ml of methylene chloride which is run in slowly while the solution is vigorously stirred. The resulting product is then suction filtered, washed several times with methylene chloride, boiled in water and dried. 452 g = 98.2 percent of a polyamide powder which is soluble in N-methylpyrrolidone in the cold are obtained.

EXAMPLE 7

134 g (½ mol) of 3-(p-aminophenyl)-7-amino-(1H,3H)-quinazoline-dione are suspended in 700 g of anhydrous dimethylacetamide. The compound is polycondensed with 101.5 g (½ mol) of isophthalic acid dichloride as described in Example 1. The reaction mixture is then stirred for 4 hours at room temperature and 700 g of acetonitrile are then slowly run in with vigorous stirring. The reaction mixture is then neutralised with ammonia and suction filtered as described in Example 1. The precipitate is washed with 350 g of acetonitrile. It is then introduced into 2.5 litres of water and slowly heated to 60°C with vigorous stirring, again suction filtered, washed free from chloride and dried. Yield 195 g = 98 percent of the theory.

What we claim is:

1. A process for isolating in powder form, aromatic polyamides which are readily soluble in polar organic solvents which comprises diluting solutions of the readily soluble aromatic polyamides obtained by polycondensation of aromatic diamines and aromatic dicarboxylic acid chlorides in polar organic amidic solvents to 1.5 to 4 times their original volume with a liquid halogenated or CN-containing hydrocarbon without first being neutralised and precipitating the polyamide from the resulting clear, dilute solutions in the form of a fine powder by passing ammonia into or over the solutions until the solvent mixture is neutral in reaction.

2. The process according to claim 1, which comprises using as the liquid, halogenated aliphatic hydrocarbon a low molecular weight, aliphatic hydrocarbon with one to eight carbon atoms which contains at least one halogen atom.

3. The process according to claim 1, wherein the liquid, halogenated aliphatic hydrocarbon used is methylene chloride.

4. The process according to claim 1, wherein the liquid, halogenated aliphatic hydrocarbon used is chloroform.

5. The process according to claim 1, wherein the liquid, halogenated aliphatic hydrocarbon used is 1,2-dichloroethane.

6. The process according to claim 1, wherein the liquid aliphatic hydrocarbon used which contains CN groups is a low molecular weight, aliphatic hydrocarbon with one to eight carbon atoms which contains at least one CN group.

7. The process according to claim 1, wherein the liquid aliphatic hydrocarbon used which contains CN groups is acetonitrile.

8. The process according to claim 1, wherein the easily soluble aromatic polyamide is a polyamide of isophthalic acid dichloride and a diamine of the formula

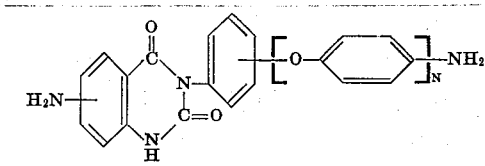

in which n = 0 or 1.

9. The process according to claim 1, wherein the aromatic polyamide is a polyamide of isophthalic acid dichloride and 3-(p-aminophenyl)-7-amino-(1H,3H)-quinazoline-dione-(2,4).

10. The process according to claim 1, wherein the soluble aromatic polyamide used is a polyamide of terephthalic acid dichloride and a diamine of the formula

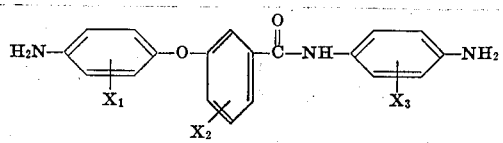

or the formula

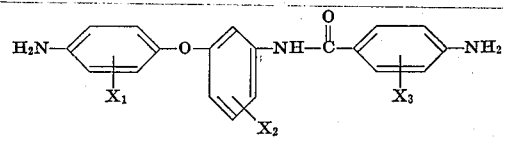

in which $X_1$, $X_2$ and $X_3$ = hydrogen, $CH_3$ or Cl.

* * * * *